Patented July 2, 1946

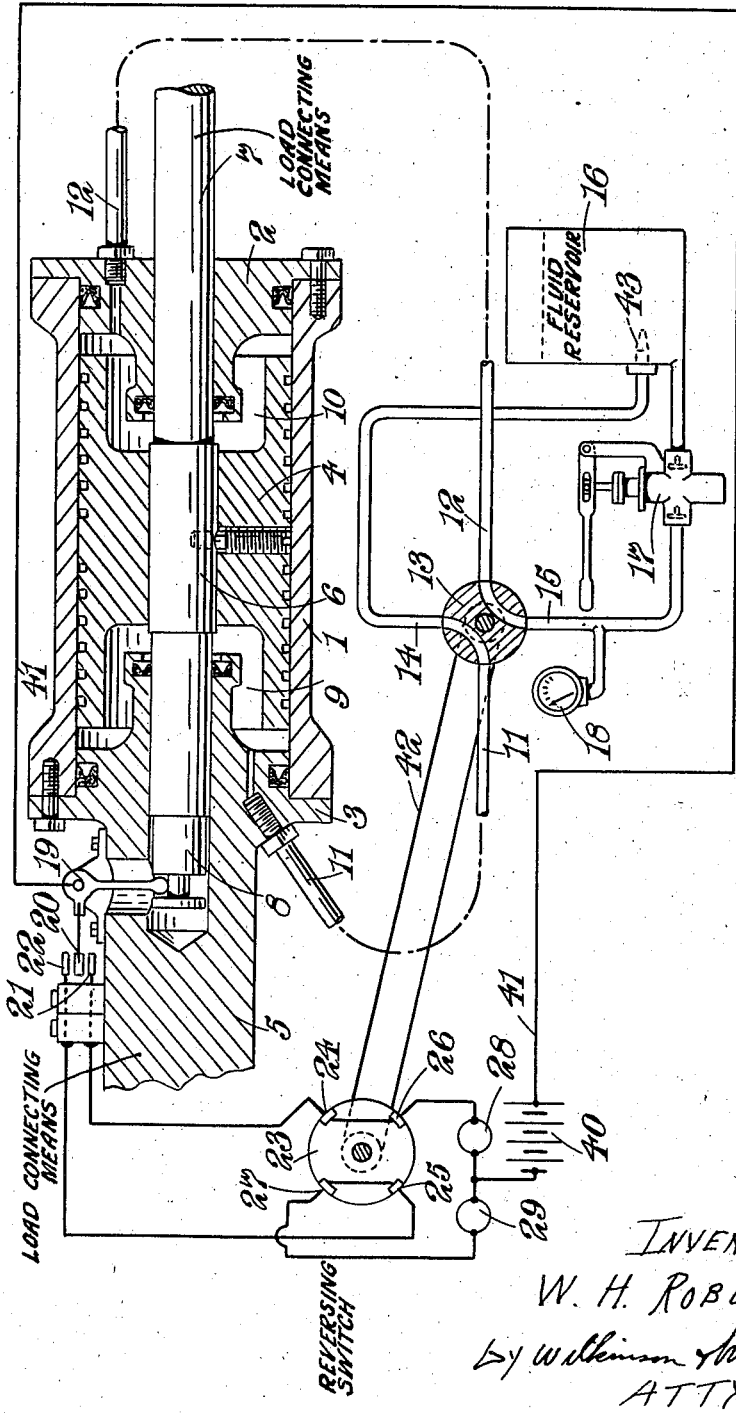

2,403,194

UNITED STATES PATENT OFFICE 2,403,194

APPARATUS FOR MEASURING TENSILE OR COMPRESSION LOADS

William Henry Roberts, Gloucester, England, assignor to Rotol Limited, Gloucester, England, a British company Application November 29, 1943, Serial No. 512,240
In Great Britain September 30, 1942

5 Claims. (Cl. 73—93)

This invention relates to apparatus for measuring tensile or compression loads such as in a structural member, or the draw-bar pull of a locomotive, or in general any member of a mechanical structure which is subjected to a variable load. A particular application of this invention is to the apparatus described in United States Patent No. 2,362,308, granted November 7, 1944, wherein it is required to measure the torque reaction of a prime mover.

According to this invention, a hydraulic double-acting ram comprising a relatively reciprocable piston and cylinder is used to convert the tensile or compression load into hydraulic pressure which is measured by a suitable gauge, and means are provided for adjusting the relative positions of the piston and cylinder at the moment when the pressure, and hence the load, is being measured. The making of this adjustment is desirable in order that it can be ensured that the piston is not sticking in the cylinder, and that the pressure developed by the load should always be measured when there is no deflection or displacement of the rim.

The said means may comprise a pump arranged to deliver liquid into that end of the cylinder towards which the piston has been moved by the applied load, so as to return it to its normal mid position or any other selected datum position. Preferably, a single pump is used, with a change-over valve so that it can supply either end of the cylinder, and the pressure-gauge which is used to measure the pressure corresponding to the load is connected to the pipe between the pump and the change-over valve.

It is preferable also to provide means for opening to drain the end of the cylinder which is not subjected to pressure by the applied load, in order that the pressure on that side of the piston should be constant in all circumstances; if any leakage takes place past the piston, as may occur when very high pressures are developed, such leakage escapes freely to drain and does not introduce any error in the pressure read on the gauge. The change-over-valve above referred to may be a duplex one in that it effects the change-over of the pump connection and drain connection simultaneously between the two ends of the cylinder.

According to another feature of this invention, the drain outlet communicates with the reservoir which supplies the pump, and the outlet to the reservoir may be restricted, or in the form of a leaking non-return valve. This is advantageous if the load which is being measured is liable to reversal, insofar as it prevents sudden movements of the piston in the cylinder.

The invention also provides as hereinafter described, means for indicating when the piston is in its datum position at which readings of the pressure may be taken.

The single figure of accompanying drawing illustrates in section one construction of hydraulic ram, with a diagrammatic layout of the associated parts of the device.

The hydraulic ram comprises a cylinder 1 closed by end-plates 2, 3, with a piston 4 reciprocable in it. The end-plate 3 of the piston is provided with an axial extension 5 which is formed in any convenient manner so as to be capable of being connected to one of the members transmitting the load to be measured. The piston rod 6 extends at 7 through the other end-plate 2 of the cylinder and is adapted to be connected to the other member bearing the load which is to be measured. The piston rod 6 is also extended into the end cover 3 at 8 for the purpose hereinafter described. The piston 4 is intended to float between the end-plates of the cylinder so that two chambers 9 and 10 are provided, one on each side of the piston, and these chambers are made fluid-tight by suitable packings and communication is provided respectively to each chamber by pipe-connections 11, 12 preferably entering through the end-plates. In this construction oil is used as the hydraulic liquid.

The pipe-connections 11, 12 are connected to a change-over valve 13 so that they can be put respectively into communication alternatively with pipes 14 and 15. The pipe 14 is a drain pipe communicating with a reservoir 16, whilst the pipe 15 is connected to a pump 17 which draws its supply from the reservoir 16. This pump 17 may be of any convenient form and since it is required to deal only with small quantities of liquid, which however may have to be delivered at a high pressure, it is conveniently a hand-operated reciprocating pump.

A pressure gauge 18 is connected to the pipe-line 15 between the pump and the change-over-valve 13.

An indicator is provided for the device to show the movements of the piston in the cylinder and in particular to show when it is in its central or datum position in which it is desirable that the pressure measurements should be made. The end 8 of the piston rod engages a lever 19 which operates the contact 20 of an electric switch, this contact being so arranged that when the piston is in its middle position, the contact lies between two co-operating contacts 21, 22, but when it is moved in one direction or the other it engages one or the other of these contacts. The two contacts 21, 22 are connected to a reversing switch 23 at the contacts 24, 25 respectively thereof, and the other contacts of this switch 26, 27 are connected to two indicating lamps 28, 29 respectively and through them to a battery 40 from which the circuit is completed by a line 41 to the switch contact-member 20 aforesaid. Conveniently, the lamps 28 and 29 are marked or coloured, say green and red respectively, to make them more distinctive.

The switch 23 is coupled as indicated diagrammatically at 42 to the change-over-valve 13 so that adjustment of the change-over-valve from one of its settings to the other reverses the circuit connections of the switch 23.

In the operation of this device, assuming that the piston 4 is in its middle position as indicated, and that a tension load is applied between the members 5 and 7, the oil in the chamber 10 is put under compression, and in the particular setting of the change-over-valve illustrated, the pipe 12 is connected to the pump 17 so that the non-return delivery valve of the pump prevents any escape of oil and the pressure generated in the chamber 10 is indicated on the gauge 18, and is a measure of the load which is being applied. For small loadings on the piston which result in very small displacements of it in the cylinder, the pressure may be measured directly, but when high pressure loadings are involved, a substantial movement of the piston in the cylinder may occur due to leakage of the oil past the piston, the compressibility of the oil and any other leakage in the system, and if the pressure is measured under these conditions errors may be introduced. Also it has been found in practice that with a device of this type there is a risk of the piston sticking in the cylinder, in which case serious errors are introduced.

In order to obviate all these errors, the apparatus is used in the following manner:

If the load has been applied to the piston 4 and it has moved towards the right-hand end of the cylinder, the contacts 20, 21 engage one another and a circuit is therefore provided lighting up the green lamp 28. The hand-pump 17 is then operated to pump oil into the chamber 10 so as to move the piston back to its datum or middle position. This is indicated by the lamp 28 being no longer illuminated, since the circuit is broken at the contacts 20, 21 by the return movement of the piston to its middle position. The pressure indicated on the gauge 18 is then a true measure of the load and it is further ensured that the piston is always in the same condition when making the measurement and that it is moving freely in the cylinder at the time when the measurement is made; any loading due to out-of-balance of the whole assembly when used in the torque-measuring device above mentioned, is thereby reduced to a minimum.

In describing the operation it was assumed that the change-over-valve 13 was set in the position indicated in the drawing and that the applied load tended to move the piston towards the right. If alternatively, the change-over-valve 13 had been in its other position so that the chamber 10 was open to drain, the application of the tensile load would not be opposed and the piston would be moved by the load. In order to prevent too sudden movement, the outlet from the drain pipe 14 to the reservoir 16 is preferably restricted as shown at 43 so as to allow only a slight discharge of the oil. With this setting of the change-over-valve 13, however, the reversing switch 23 will also be in its other setting and the closure of the contacts 20, 21 would complete the circuit through the red lamp 29. The lighting up of this lamp immediately shows the operator that the change-over-valve 13 should be reversed and when he makes the necessary adjustment, the simultaneous adjustment of the switch 23 would cause the green lamp 28 to be lighted. The use of these two lamps therefore simplifies the operation of the device. As soon as the load is applied, if the red lamp lights up the operator knows that he must reverse the change-over-valve 13 thereby lighting the green lamp. When the green lamp is alight the operator works the pump 17 until the green lamp is extinguished and then reads off the pressure on the gauge 18. If when the load is applied the green lamp lights up, the operator knows that he need not reverse the setting of the valve 13, but can proceed with the pumping forthwith.

The use of the restricted outlet 43 on the drain pipe 14 also safeguards the apparatus against sudden removal or reversal of the load. It is also desirable that the outlet 43 from the drain pipe should communicate with the oil reservoir 16 at a point below the surface of the oil therein. This ensures that when the piston moves to increase the volume of the chamber which is connected to drain, oil will be sucked in so as to keep the chamber full. Preferably, therefore, the reservoir 16 is arranged at the same level as, or above, the cylinder to ensure that the cylinder is maintained full of oil.

In applying the invention to the apparatus described in prior United States Patent No. 2,362,308, granted November 7, 1944, very high pressure, of 2,000 to 3,000 lbs. per square inch or more may be developed, and it is therefore desirable that the sealing arrangements on the cylinder and piston should be as effective as possible. The piston may be made very long compared with its diameter for this purpose and provided with sealing grooves on its periphery. It will be appreciated, however, that since the piston is brought to its datum position by supplying oil to the cylinder before a measurement is taken, any leakage which may have occurred is compensated by the use of the pump.

The apparatus above described has the advantage over known forms of apparatus for a similar purpose in that it is sensitive to small changes of load, whilst being capable of registering very high loads, and it does not tend to stick in any position or positions over its operating range.

I claim:

1. In apparatus for measuring tensile or compression loads, the combination with a hydraulic cylinder and piston to convert the load into hydraulic pressure, and a pressure measuring gauge, of a single pump arranged to deliver a liquid into that end of the cylinder towards which the piston has been moved by the applied load for forcibly returning the piston to a neutral position before the pressure reading is taken, and a change-over-valve whereby the pump can supply either end of the cylinder and having a connection to drain.

2. Apparatus according to claim 1, wherein the pressure-gauge is connected to the system between the pump and the change-over-valve.

3. Apparatus according to claim 1, comprising means for opening to drain that end of the cylinder from which the piston has been moved by the applied load.

4. Apparatus according to claim 1, wherein the change-over-valve connects alternatively either end of the cylinder to the pump and the other end to a reservoir from which the pump is supplied.

5. Apparatus according to claim 1, wherein the connection to drain is restricted, for the purpose set forth.

WILLIAM HENRY ROBERTS.